United States Patent Office 2,953,168
Patented Sept. 20, 1960

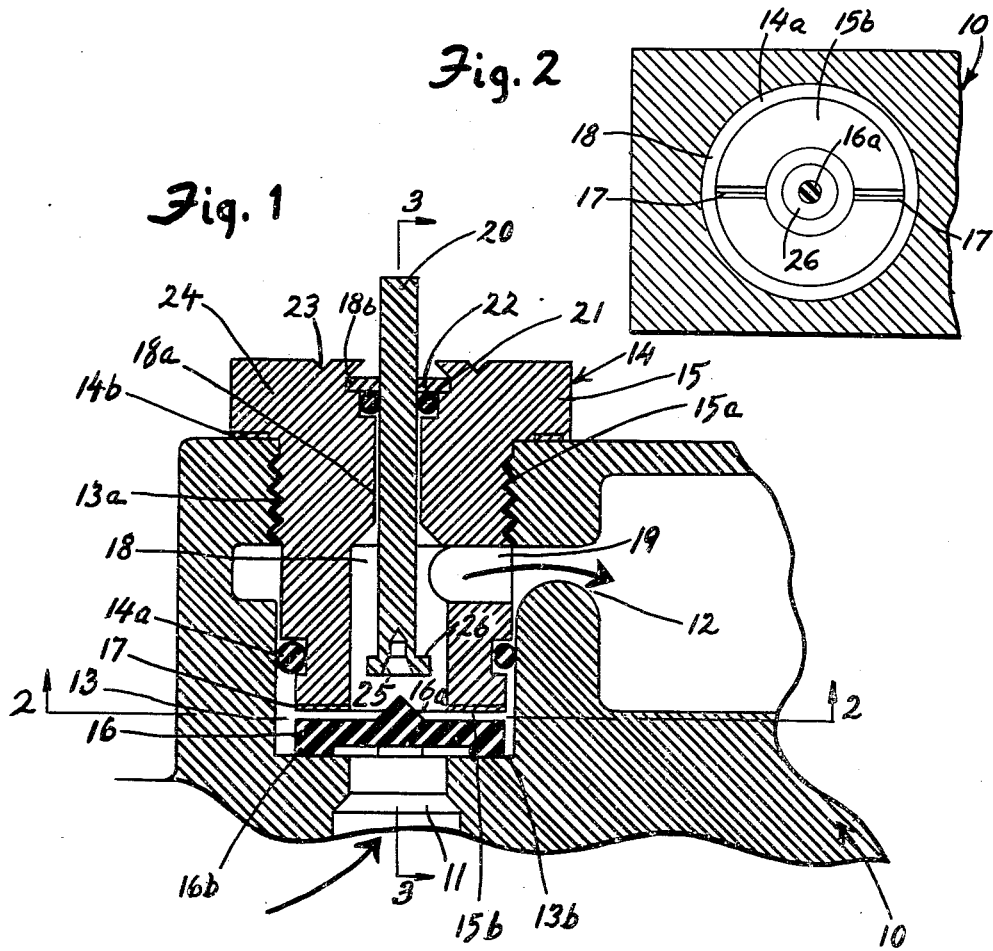

2,953,168

UNPLUGGING MECHANISM FOR FLOW CONTROL DEVICE

Donald R. Vomacka, 2313 Belmont Ave., Chicago 18, Ill.

Filed Aug. 20, 1956, Ser. No. 605,030

3 Claims. (Cl. 138—43)

This invention relates to a flow control device, and, more particularly, to an unplugging device therefor.

Flow control devices of the nature to which this invention is directed are the relatively inexpensive and widely distributed type found in automatic washing machines, drinking fountains, home water softening equipment and the like. For such uses the control must be reasonably accurate, rugged and inexpensive.

Generally, the flow control devices used embody a resilient diaphragm capable of being flexed so as to partially close a rather small orifice, the flexure being achieved by liquid pressure. In essence, therefor, the function of flow control is to maintain a constant rate of fluid flow irrespective of variations in liquid pressure over a reasonably wide range, such as fifteen to two hundred pounds per square inch. Upon instantaneous increase in pressure, a resilient diaphragm element is forced into a flexed position so as to obstruct a greater portion of the orifice, and thus reduce flow.

It is to be appreciated that with relatively small orifices employed in such devices, the possibility of plugging is substantial. In presently marketed devices the only remedy for a plugged orifice is to dismantle the device and clean it out manually. Not only is this time-consuming but very often cumbersome since a substantial portion of the unit in which the device is employed must also be dismantled to obtain access to the flow control device. By the improvement of my invention this laborious procedure is eliminated, unplugging being achieved by a simple touch of the finger if the unplugging mechanism is manually operated. It is to be understood that the mechanism can also be operated automatically through signalling devices actuated by decrease in liquid flow. Since, however, the flow control is employed because of its low cost, it is expected that manual operation of the unplugging mechanism will be preferred.

My invention will be explained in conjunction with the accompanying drawing in which Fig. 1 is a fragmentary cross-sectional view of a valve embodying teachings of the invention and having the threaded portions thereof fully engaged; Fig. 2 is a cross-sectional view taken along the line 2—2 of Fig. 1; and Fig. 3 is a partial vertical sectional view of the valve with the threaded portions partially disengaged.

Referring now to the drawing, the numeral 10 generally designates a valve portion or other device with which a flow control is employed. In the fragment of a valve shown, fluid flow is designed to enter at the bottom and discharge from the right side as indicated by arrows. Valve portion 10 is provided with an inlet port 11 at the bottom thereof and an outlet port 12 at the right side thereof. Chamber 13 is formed in valve portion 10 intermediate the two ports. In the pictured embodiment chamber 13 is a cylindrical hole cast in the wall of the valve body and provided with threads 13a adjacent the outer wall of valve portion 10.

Threadably mounted in chamber 13 is flow control 14.

Flow control 14 includes a unitary screw-machined body 15 provided with external threads 15a arranged to permit threadable receipt of body 15 into internally threaded chamber 13. Mounted in chamber 13 between the inner end wall 13b of chamber 13 and the inner end wall 15b of body 15 is resilient diaphragm 16.

Provided in the inner end wall 15b of flow control body portion 15 is one or more transverse grooves 17. When diaphragm is pressed firmly against end wall 15b, flow of liquid entering port 11 and exiting through port 12 is achieved through grooves 17. As greater pressure is exerted on the face of diaphragm 16 adjacent inlet portion 11, diaphragm 16 is flexed against flow control body 15 and into grooves or orifices 17, thereby preventing increase in flow which would ordinarily be brought about by increased pressure.

In the embodiment pictured, diaphragm 16 is provided with a centrally disposed protuberance 16a on the face thereof adjacent flow control body 15. This substantially aids in keeping diaphragm 16 centered in passage 18 extending through flow control body 15. The face of diaphragm 16 opposite that provided with protuberance 16a, is provided with lugs 16b spacing that face from the inner end wall of chamber 13, thereby permitting unobstructed fluid flow at all times.

Body portion 15 of flow control 14 is provided with a straight passage 18 extending therethrough. Communicating with passage 18 and in angled relation thereto is passage 19. Thus, a portion of passage 18 and passage 19 provide the conduit through which fluid flow occurs in flow control body 15. Passage 19 communicates directly with outlet port 12 while one end of passage 18 is axially disposed to but spaced from inlet port 11 to accommodate the interposition of diaphragm 16. Fluid flow is restricted to the above designated passages 18 and 19 by the provision of O-ring seal 14a which prevents by-pass of fluid around the lower portion of body 15 and by gasket 14b which prevents by-pass around the upper portion thereof.

The portion of straight passage 18 outward of athwart passage 19 provides a site for the mounting of my unplugging mechanism. For this purpose, that outward portion of passage 18 is constricted and designated 18a. Slidingly mounted in passage 18a is unplugging member 20. Member 20 is mounted in liquid-tight relation to body 15 not only by the cooperation of the constricted portion 18a of passage 18, but also by a rubber O-ring 21. To accommodate O-ring 21 passage 18 is enlarged at its end opposite the liquid entrance end. Outward of the enlargement of passage 18 needed to accommodate O-ring 21 is a second and greater enlargement 18b serving to receive washer 22 which is held securely in enlargement 18b by staking the outer end wall of body 15 as at 23. To permit an easier threading of flow control body 15 into chamber 13, I provide body 15 with an annular flanged portion 24 at its outer end. The inner surface of flanged portion 24 provides a shoulder bearing against valve body 10.

Referring again to member 20, it is to be noted that the inwardly extending end thereof is provided with a recess 25 so arranged and constructed as to receive a substantial portion of protuberance 16a when member 20 is slid inwardly. Also provided on member 20 at the inward end thereof is annular flange 26. Flange 26 not only serves to limit the inadvertent withdrawal of member 20 beyond the constricted portion 18a of passage 18, but also cooperates with recess 25 to provide substantial bearing area for liquid pressures to be applied so as to partially eject member 20 from its maximum inward position. Thus, when a minute solid particle lodges in groove 17 to prevent liquid flow therethrough, all that is needed to dislodge the particle is for an operator to depress member 20. Liquid flow provided by the system in which the flow control is employed dislodges the particle so as to resume the desired flow and, at the same time, returns to standby position member 20.

The foregoing detailed description is given for clearness of understanding only and no unnecessary limitations are to be inferred therefrom.

I claim:

1. In a liquid flow control device, a body having a passage therethrough, one end opening of said passage providing a liquid entry port, an inwardly-extending shoulder in said passage, a resilient diaphragm movably mounted in said passage adjacent said shoulder and between said shoulder and said entry port, said shoulder and diaphragm defining orifice means, a discharge port on said passage intermediate the ends thereof and on the side of said shoulder remote from said diaphragm, an unplugging member slidingly, sealingly mounted in said passage and extending outward of said body through the end opening of said passage opposite said entry port, said member normally being spaced from said diaphragm and operative to be moved toward said diaphragm to contact and move the same.

2. In a liquid flow control device, a body having a straight passage extending therethrough, one end of said passage providing a liquid entrance port, a resilient diaphragm movably mounted in said passage adjacent said entrance port, said passage being equipped with an inwardly-extending shoulder spaced from said entrance port, said diaphragm being urged against said shoulder by pressurized liquid entering said entrance port, said shoulder and said diaphragm defining orifice means for liquid flow therebetween, a second passage in said body in angled relation to said straight passage and communicating with said straight passage between said shoulder and the other end of said straight passage, said second passage providing a liquid discharge port, and an unplugging member slidingly, sealingly mounted in said straight passage and extending out of said body through the other end of said straight passage, said member normally being spaced from said diaphragm but movable theretoward to contact and move the same, said resilient diaphragm being equipped with a centrally-disposed protuberance on the side thereof adjacent said unplugging member, and said unplugging member being equipped with a protuberance-fitting recess in the end thereof adjacent said diaphragm.

3. In a liquid flow device, a body having a straight passage therein equipped with a liquid inlet at one end and a liquid outlet in the side wall intermediate the ends of said passage, a resilient diaphragm movably mounted in said passage adjacent the said inlet, said passage being constricted a spaced distance from said one end to provide a shoulder engageable by said diaphragm, at least one groove in said shoulder in the face thereof engaged by said diaphragm, and an unplugging member slidingly, sealingly mounted in the other end of said passage and extending partially outward of said body, said member being normally spaced from said diaphragm and adapted to engage said diaphragm, said unplugging member being enlarged at the inner end thereof.

References Cited in the file of this patent

UNITED STATES PATENTS

| | | |
|---|---|---|
| 1,195,080 | Pettit | Aug. 15, 1916 |
| 1,818,856 | Langdon | Aug. 11, 1931 |
| 2,504,678 | Gardner | Apr. 18, 1950 |
| 2,511,733 | Morrison | June 13, 1950 |
| 2,638,929 | Delany et al. | May 19, 1953 |
| 2,762,397 | Miller | Sept. 11, 1956 |